COMBINED SHIFT REGISTER AND COUNTER CIRCUIT

Filed June 28, 1954 3 Sheets-Sheet 1

INVENTOR.
ERNST S. SELMER
BY James B. Christie
ATTORNEY

INVENTOR.
ERNST S. SELMER
BY James B. Christie
ATTORNEY

Aug. 22, 1961 E. S. SELMER 2,997,233

COMBINED SHIFT REGISTER AND COUNTER CIRCUIT

Filed June 28, 1954 3 Sheets-Sheet 3

INVENTOR.
ERNST S. SELMER
BY James B. Christie
ATTORNEY

United States Patent Office 2,997,233

Patented Aug. 22, 1961

2,997,233

COMBINED SHIFT REGISTER AND COUNTER CIRCUIT

Ernst S. Selmer, Oslo, Norway, assignor, by mesne assignments, to Burroughs Corporation, Detroit, Mich., a corporation of Michigan Filed June 28, 1954, Ser. No. 439,761
2 Claims. (Cl. 235—92)

This invention relates to counting apparatus, and more particularly to a combined register and counter for registering and counting digital information.

In data processing equipment the individlual digits of a multiple digit number are frequently coded in a permutation counting system where the numbers are transferred serially digit after digit.

To receive and provide a registration of serially transferred digits, a shifting register may be employed which comprises a plurality of sets of bi-stable circuits, each of which is capable of registering a single digit, and which is coupled to an adjacent set in such a way that the registrations of the digits may be shifted along the sets of bi-stable circuits until all of the digits of a multiple digit number are registered. For some applications, in addition to registering a multiple digit number, it is necessary to perform a counting operation.

I have found that a shifting register may be adapted to count by employing a portion of a register as a counter. Therefore, in accordance with my invention, in a register comprising a plurality of sets of bi-stable circuits, each of which is capable of registering a digit of a multiple digit number, a selected set of the plurality of sets of bi-stable circuits is interconnected in such a way that it may be employed as a counter as well as a register. Also, a sensing means may be coupled to the selected set to determine when a carry operation is to be performed from one significant digit to a more significant digit. By this means a single set of bi-stable circuits may be employed in connection with a shifting register to count up to a maximum number having a number of digits equal to the number of sets of bi-stable circuits, each digit of which has a maximum number equal to the number of allowable permutations in a set of the bi-stable circuits.

In a particular embodiment, the individual digits of a multiple digit number are codded in binary coded decimal notation ranging from zero to nine. This means that a decade of four bi-stable circuits may be employed to register each decimal digit. The permutations and corresponding decimal digits may be as follows:

| Number | Binary Code | | | |
|---|---|---|---|---|
| | 1 | 2 | 4 | 8 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

where "1" indicates one condition of operation in a bi-stable circuit and "0" indicates another condition of operation.

By coupling a plurality of decades together, so that the registration in a particular set of bi-stable circuits forming one decade may be shifted into the bi-stable circuits forming an adjacent decade, a register may be formed in which a number may be represented by introducing binary coded decimal digits into an end decade, one by one, and thereafter shifting the digits along the decades of the register until a number having a given number of decimal digits is represented in a like number of decades in the register.

By interconnecting the bi-stable circuits of one decade to form a counter, the registration shifted into that decade may be increased by energizing the counting interconnection circuit. In order to provide for a carry in the case where the registration in the decade passes through zero during the counting operation, a sensing circuit is coupled to the bi-stable circuits of the interconnected decade. When the next succeeding binary coded digit after a counting operation is shifted into the interconnected decade, the counting interconnection circuit is energized to increase the registration when the sensing circuit indicates that the preceding registration in the interconnected decade, before the counting operation, was equal to the maximum allowable count preceding zero.

A better understanding of the invention may be had upon a reading of the following detailed description when taken in connection with the drawings, in which.

Figure 1:
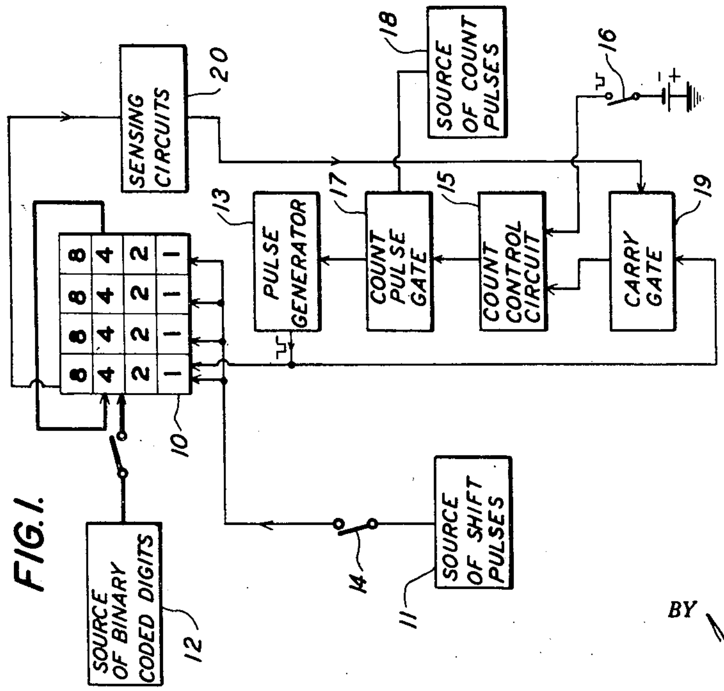
FIG. 1 is a block diagram of an illustrative embodiment of the invention.

In FIG. 1 a register 10 includes four vertical sets of bi-stable circuits, each of which in turn includes four bi-stable circuits. Each bi-stable circuit stores one binary bit, either a zero or a one, depending upon its state. As noted, the bi-stable circuits of each vertical set of four bi-stable circuits, referred to as a decade, is adapted to register four binary bits forming a binary coded decimal digit in the conventional 1, 2, 4, 8 notation. The bi-stable circuits of each of the decades are connected to corresponding bi-stable circuits of an adjacent decade so that a multiple decimal digit number from a source of binary coded decimal digits 12 may be shifted along the register by shifting the four bits of each coded digit simultaneously in parallel in response to shift pulses from a source of shift pulses 11.

The decade of the register selected to perform the counting operation in the embodiment of FIG. 1 is the end decade to which the digits are applied from the source of binary coded digits 12. When the pulse generator 13 applies a pulse to the end decade, the circuit is arranged so that the registration in the end decade is increased by one count.

Assuming that the least significant digit of a multiple digit number is applied to the end decade, the digit may be shifted and registered in the end decade in response to a pulse from the source of shift pulses 11 passed by the switch 14. If a count operation is to be performed, a negative pulse may be applied to the count control circuit 15 by closing a switch 16. This causes the count pulse gate 17 to open and a pulse from a source of count pulses 18 to be passed to the pulse generator 13. In the apparatus of FIG. 1 one count pulse appears at the output of the source of count pulses 18 for every shift pulse appearing at the output of the source of shift pulses 11. That is, the apparatus of FIG. 1 is adapted to raise the count in the end decade one count per shifting operation.

In response to the count pulse, the count pulse generator 13 generates a pulse which is applied to the end decade of the register 10 and to the carry gate 19. If the maximum allowable registration in each of the sets of the register 10 is to be limited to nine, and the registration in the end decade before the counting operation is any number other than nine, the carry gate 19 will pass the pulse generated by the pulse generator 13 to the count control circuit 15. In response to the pulse from the carry gate 19, the count control circuit 15 closes the count pulse gate 17, thereby inhibiting the passage of any succeeding count pulses from the source of count pulses 18 to the pulse generator 13.

However, if the registration in the end decade before the count operation equals nine, a sensing circuit 20 supplies a signal which closes the carry gate 19 and the count control circuit 15 remains in that condition which maintains the count pulse gate 17 in open position. Thus, a count pulse from the source of count pulses 18 is applied to the pulse generator 13 via the count pulse gate 17. However, the pulse from the pulse generator 13 does not reach the count control circuit 15 because the carry gate 19 is closed. When the next succeeding digit of the multiple digit number is applied to the end decade of the register 10, a shift pulse from the source of shift pulses 11 causes the registration existing after the count operation to be shifted to the adjacent decade and the new digit to be registered in the end decade. The next count pulse from the source of count pulses 18 is passed by the count pulse gate 17 to the pulse generator 13, which in turn energizes the counting circuit associated with the end decade thereby functioning to provide a carry from one significant digit to the next significant digit. However, if the registration in the end decade before the pulse is applied by the pulse generator 13 is any number other than nine, the pulse from the pulse generator 13 is passed to the count control circuit 15 by the carry gate 19, causing the count control circuit 15 to close the count pulse gate 17 thereby inhibiting a carry operation.

It will be appreciated that the sensing circuit 20 may be arranged to provide a signal to close the carry gate 19 for any desired registration in the end decade. Where the maximum number of permutations of a set of four bi-stable circuits is employed, i.e., zero to 15, the sensing circuit 20 might be arranged to provide a signal for closing the carry gate 19 when the registration in the end decade equals 15.

As indicated in FIG. 1, the registration in the right end decade of the register 10 may be shifted into the left end decade, if desired. By this means the registration in the register 10 may be re-circulated and shifted through the register as many times as desired and a separate counting operation may be performed for each re-circulation.

Although the apparatus of FIG. 1 is arranged to increase the registration in the end decade by only one count at a time, it will be appreciated that the apparatus is not limited thereto. Pulses from the source of count pulses 18 may be applied to the apparatus to cause the apparatus to count by any selected number of counts, providing provision is made for the proper number of carries with the registration in the end decade is caused to pass through a maximum allowable count more than once. For example, if the number standing in the end decade equals 5 and 20 count pulses are applied to the end decade, provision may be made for the application of two count pulses to the next significant digit shifted into the end decade.

Figure 2:
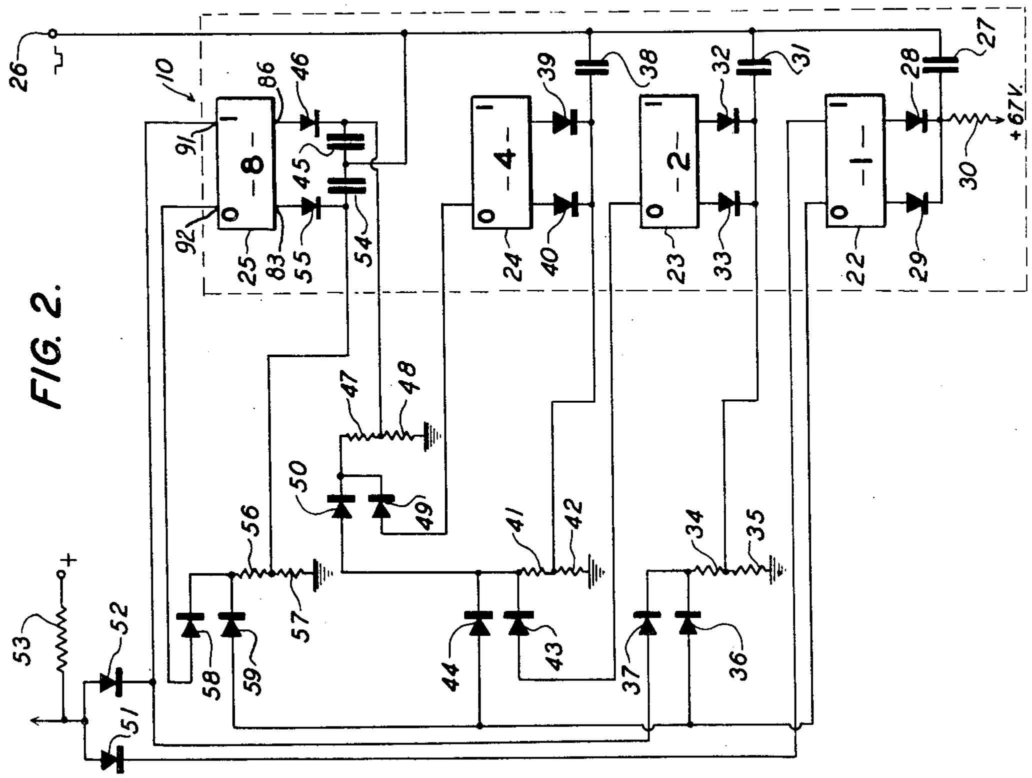
FIG. 2 is a combination block and schematic circuit diagram of a portion of the register of FIG. 1.

FIG. 2 shows one type of counting interconnection circuit for use with the left end decade of the register 10 in FIG. 1. The decade of FIG. 2 includes a binary 1 registering circuit 22, a binary 2 registering circuit 23, a binary 4 registering circuit 24 and a binary 8 registering circuit 25. Each of the binary number registering circuits 22—25 may comprise a bi-stable circuit, one type of which is described in detail below in connection with FIG. 4.

The apparatus of FIG. 2 is adapted to count in the binary code set forth above. It will be assumed that when a bi-stable circuit is in its "0" condition, a relatively high potential is provided from the "0" side of the bi-stable circuit, and a relatively low potential is provided from the "1" side of the bi-stable circuit. In like manner, it will be assumed that when a bi-stable circuit is in its "1" condition, a relatively high potential is provided from the "1" side of the bi-stable circuit, while a relatively low potential is provided from the "0" side of the bi-stable circuit.

Assuming that the binary number registering circuits 22—25 are all in their "0" condition of operation, a negative going counting pulse applied to the terminal 26 will be passed to the "1" side of the binary 1 registering circuit via the capacitor 27 and a diode 28. A suitable threshold potential for maintaining the diode 28 and the diode 29 in non-conducting condition, except when a negative going counting pulse appears, may be provided by means of a resistor 30 which is connected serially between the diodes 28 and 29 and a suitable source of positive potential (not shown). The number one, therefore, is registered in the decade by the binary 1 registering circuit being in its "1" condition.

When the number one is registered in the decade, a negative going counting pulse applied to the terminal 26 is passed to the "0" side of the binary 1 registering circuit 22 via the capacitor 27 and the diode 29. This causes the binary 1 registering circuit to resume its "0" condition. The negative going counting pulse also is applied to the "1" side of the binary 2 registering circuit 23 via a capacitor 31 and a diode 32. The threshold potential for the diodes 32 and 33 is derived from an intermediate point on a voltage divider comprising the resistors 34 and 35. The potential across the voltage divider, including the resistors 34 and 35, is determined in part by the voltage on the "0" side of the binary 1 registering circuit 22 via a diode 36, and in part by the voltage appearing on the "1" side of the binary 8 registering circuit 25 via a diode 37. When the voltage from both the "0" side of the binary 1 registering circuit 22 and the voltage from the "1" side of the binary 8 registering circuit 25 are at a relatively low potential, the threshold on the diodes 32 and 33 will be of a value which will allow the negative going counting pulse to be passed to the binary 2 registering circuit 23.

When the potential on the "0" side of the binary 1 registering circuit 22 is relatively low just prior to the counting pulse, and a counting pulse is applied to the terminal 26, the binary 2 registering circuit 23 is placed in the "1" condition and the binary 1 registering circuit 22 is placed in the "0" condition.

Therefore, the number two is registered in the decade by the binary 2 registering circuit 23. When the decade registers the number two and a negative going counting pulse is applied to the terminal 26, the binary 1 registering circuit 22 is placed in its "1" condition of operation. This means that the number three is registered by the binary 2 registering circuit 23 and the binary 1 registering circuit 22 being in the "1" condition.

When the decade registers the number three and a counting pulse applied to the terminal 26 is passed to the "0" side of the binary 1 registering circuit 22, the circuit is returned to its "0" condition, and since the potential derived from the "0" side of the binary 1 registering circuit 22 prior to the fourth counting pulse is relatively low, the counting pulse is passed to the "0" side of the binary 2 registering circuit 23 via the diode 33. In addition, the counting pulse is passed to the "1" side of the binary 4 registering circuit 24 via a capacitor 38 and a diode 39. The threshold potential on the diode 39 and a diode 40 is derived from a voltage divider comprising the resistors 41 and 42. The voltage across the voltage divider of the resistors 41 and 42 is determined in part by the potential on the "0" side of the binary 2 registering circuit 23 via a diode 43, and in part by the voltage appearing on the "0" side of the binary 1 registering circuit 22 via a diode 44.

When either the voltage on the "0" side of the binary 1 registering circuit 22, or the voltage on the "0" side of the binary 2 registering circuit 23 is at a high potential, the threshold voltage on the diodes 39 and 40 inhibits the passage of any counting pulses to the binary 4 registering circuit 24. Before the counting pulse is received, both the "0" side of the binary 2 registering circuit 23 and the "0" side of the binary 1 registering circuit 22 are at a relatively low potential. This results in a threshold potential on the diodes 39 and 40 which allows the fourth counting pulse to be passed to the "1" side of the binary 4 registering circuit 24 via the diode 39. Therefore, the number four is registered in the decade by the binary 4 registering circuit 24 being in its "1" condition, the binary 2 registering circuit 23 being in its "0" condition, and the binary 1 registering circuit 22 being in its "0" condition.

When the decade registers the number four and a counting pulse is applied to the terminal 26, the binary 1 registering circuit 22 assumes its "1" condition. Therefore, the count of five is registered by the binary 4 registering circuit 24 being in its "1" condition and the binary 1 registering circuit 22 being in its "1" condition, while the binary 2 registering circuit 23 and the binary 8 registering circuit 25 remain in the "0" condition.

When the number five is registered in the decade and a counting pulse is applied to the terminal 26, the binary 1 registering circuit 22 returns to its "0" condition and the pulse is passed to the "1" side of the binary 2 registering circuit 23, since the "0" side of the binary 1 registering circuit 22 was at a relatively low potential prior to the pulse and the "1" side of the binary 8 registering circuit 25 was at a relatively low potential. Therefore, the number six is registered in the decade by the binary 4 registering circuit 24 being in its "1" condition, the binary 2 registering circuit 23 being in its "1" condition, the binary 1 registering circuit 22 being in its "0" condition, and the binary 8 registering circuit 25 being in its "0" condition.

When the number six is registered in the decade and a counting pulse is applied to the terminal 26, the condition of the binary 2 registering circuit 23, the binary 4 registering circuit 24 and the binary 8 registering circuit 25 remains the same, but the binary 1 registering circuit 22 is changed to its "1" condition, thereby resulting in a registration of the number seven.

When the number seven is registered and a counting pulse is applied to the terminal 26, the binary 1 registering circuit 22 is returned to its "0" condition. The binary 2 registering circuit 23 is returned to its "0" condition since the "0" side of the binary 1 registering circuit 22 was at a relatively low potential prior to the counting pulse and the "1" side of the binary 8 registering circuit 25 was at a low potential prior to the counting pulse.

In like manner, the binary 4 registering circuit 24 is returned to its "0" condition since the "0" side of the binary 1 registering circuit, and the "0" side of the binary 2 registering circuit 23 were at a relatively low potential prior to the counting pulse.

In addition, the counting pulse is passed to the "1" side of the binary 8 registering circuit via a capacitor 45 and a diode 46. The threshold on the diode 46 is determined by the potential at an intermediate point on a voltage divider comprising the resistors 47 and 48. The potential across the voltage divider of the resistors 47 and 48 is determined by the potential on the "0" side of binary 4 registering circuit 24 via a diode 49, and the potential on the "0" sides of both the binary 2 registering circuit 23 and the binary 1 registering circuit 22 appearing across the voltage divider including the resistors 41 and 42. The potential appearing across the resistors 41 and 42 is applied to the voltage divider of the resistors 47 and 48 via a diode 50.

When the "0" side of any one of the binary digit registering circuits, 22, 23 or 24 is at a relatively high potential, the diode 46 will be inhibited from passing count pulses to the "1" side of the binary 8 registering circuit 25. Since the previous registration in the decade was such that the "0" sides of the binary number registering circuits 22, 23 and 24 were at a relatively low potential, the counting pulse is passed to the "1" side of the binary 8 registering circuit 25, thereby causing the binary 8 registering circuit to assume the "1" condition. Therefore, the number eight is registered in the decade by the binary 8 registering circuit 25 being in its "1" condition, the binary 4 registering circuit 24 being in its "0" condition, the binary 2 registering circuit 23 being in its "0" condition, and the binary 1 registering circuit 22 being in its "0" condition.

When the number 8 is registered in the decade and the next counting pulse appears, the binary 8 registering circuit 25, the binary 4 registering circuit 24, and the binary 2 registering circuit 23 remain in their previous conditions of operation. However, the binary 1 registering circuit 22 is changed from its "0" condition of operation to its "1" condition. Thus, the number nine is registered in the decade by the binary 8 registering circuit 25 being in its "1" condition, the binary 4 registering circuit 24 being in its "0" condition, the binary 2 registering circuit 23 being in its "0" condition and the binary 1 registering circuit 22 being in its "1" condition.

The counter of FIG. 2 is of the type which is adapted to count from zero to nine. Therefore, when the number nine is registered in the decade, a counting pulse should cause all the binary number registering circuits to assume the "0" condition. Where the apparatus of FIG. 2 is to be employed in a combined register and counter, such as in FIG. 1, it is necessary to sense that condition when the number nine is registered in the decade so that the count control circuit of FIG. 1 may be maintained in position where a count pulse from the source of count pulses 18 may be passed to the decade when the next significant digit is shifted into the decade so as to propagate a carry from one significant digit to the next significant digit.

In order to provide a signal indicating that the number nine is registered in the decade, a diode 51 is connected to the "1" side of the binary 1 registering circuit 22 and a diode 52 is connected to the "1" side of the binary 8 registering circuit 25. Since the only time when the binary 8 registering circuit 25 and the binary 1 registering circuit 22 are both in the "1" condition is when the number nine is registered, the voltage at the signal end of a resistor 53 assumes a relatively high potential when the number nine is registered. On the other hand, when either the binary 8 registering circuit 25 or the binary 1 registering circuit 22 is in its "0" condition, the voltage at the signal end of the resistor 53 will be a relatively low potential. Therefore, the diodes 51 and 52 and the resistor 53 provide one suitable sensing circuit for use with the apparatus of FIG. 1.

When the number nine is registered in the decade, and the next counting pulse appears, the binary 1 registering circuit 22 is returned to its "0" condition, the binary 2 registering circuit 23 and the binary 4 registering circuit 24 remain in their "0" conditions, and the counting pulse is passed to the "0" side of the binary 8 registering circuit 25 via a capacitor 54 and a diode 55. The threshold potential on the diode 55 is determined in part by the potential at an intermediate point on a voltage divider comprising the resistors 56 and 57. The voltage across the divider is determined in part by the potential on the "0" side of the binary 8 registering circuit 25 via a diode 58 and in part by the voltage appearing on the "0" side of the binary 1 registering circuit 22 via a diode 59.

When either the "0" side of binary 8 registering circuit 25 or the "0" side of the binary 1 registering circuit 22 is at a high potential, the diode 55 will be inhibited from passing count pulses to the "0" side of the binary 8 registering circuit 25. However, when the number nine is registered in the decade, both the "0" side of the binary 8 registering circuit 25 and the "0" side of the binary 1 registering circuit 22 are at a relatively low potential, and the count pulse is passed to the "0" side of the binary 8 registering circuit 25, hereby causing it to assume its "0" condition. Therefore, when the number nine is registered in the decade, a count pulse causes all of the binary number registering circuits 22—25 to assume their "0" conditions.

It will be appreciated that the circuitry of FIG. 2 shows only the counting interconnection circuit and the circuit for sensing a registration of the number nine. Ordinarily, the initial registration in the decade is shifted into the decade from another decade or from a source of binary coded digits. Suitable circuitry for shifting information from one decade to another will be described in detail with respect to FIG. 4.

Figures 3, 4:
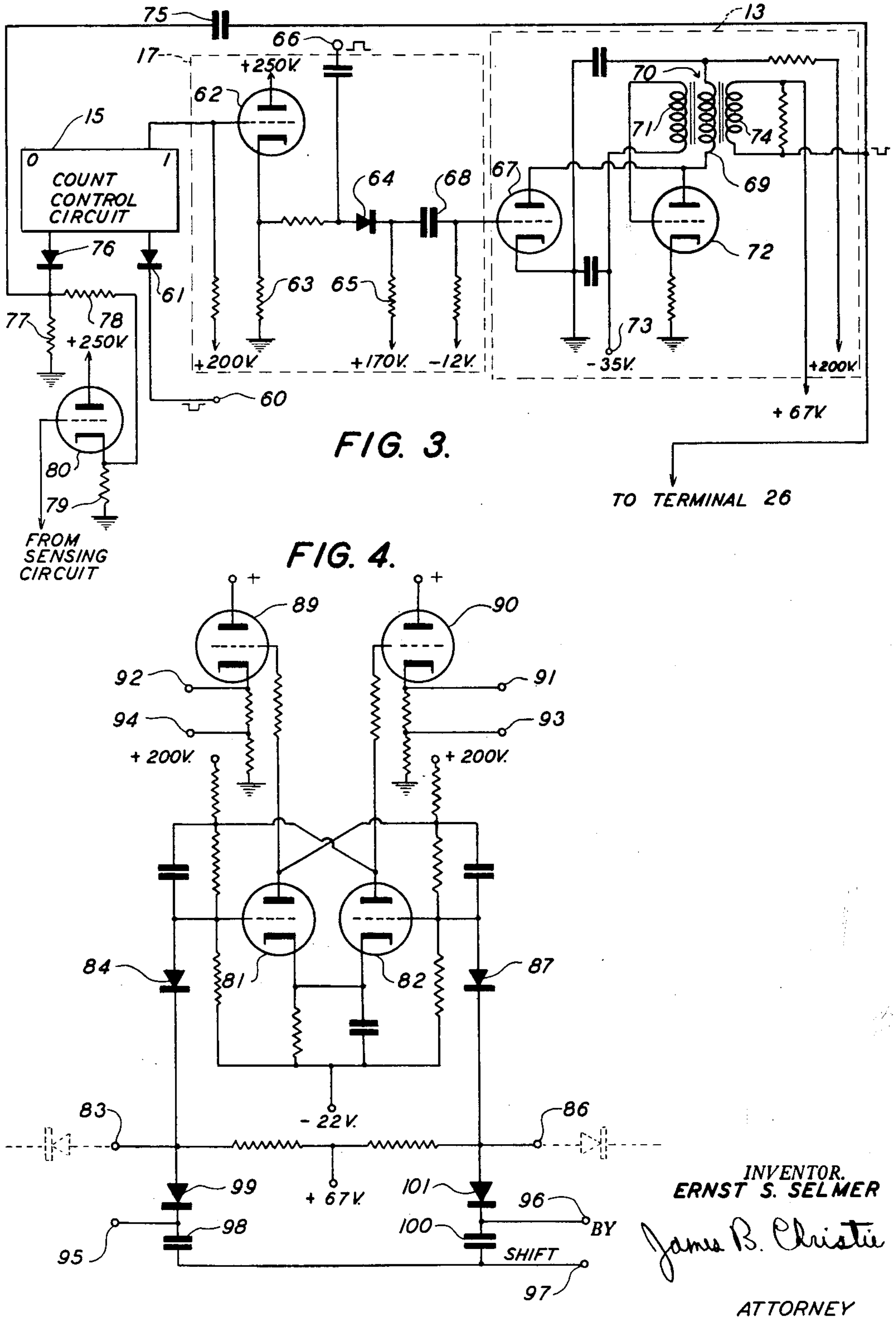
FIG. 3 is a combination block and schematic circuit diagram of a portion of the apparatus associated with the count control circuit of FIG. 1.
FIG. 4 is a schematic circuit diagram of one type of bi-stable circuit which may be employed in the register of FIG. 1.

In FIG. 3 the count control circuit 15 may be placed in its "1" condition of operation by applying a negative pulse to a terminal 60 from whence it is passed to the "1" side of the count control circuit via a diode 61.

When the count control circuit 15 is in its "1" condition, a relatively high voltage is applied to the control electrode of the electron tube 62 in the count pulse gate 17. This causes the voltage across a cathode resistor 63 to assume a relatively high potential, which is applied to a diode 64. The diode 64 receives a biasing potential via a resistor 65.

The circuit is arranged so that when the voltage across the cathode resistor 63 is at a relatively high value, the diode 64 is maintained slightly below the level at which it is rendered conducting. When a positive going count pulse is applied to the terminal 66 from the source of count pulses 18 of FIG. 1, and the potential across the cathode resistor 63 is at a relatively high potential, the diode 64 is rendered conducting and the count pulse is passed to the control electrode of a buffer amplifier electron tube 67 in the pulse generator 13 via a capacitor 68. This causes the potential at the anode of the buffer amplifier electron tube 67 to decrease, and this decrease in potential appears across the primary winding 69 of a transformer 70.

The negative pulse appearing across the primary winding 69 induces a positive pulse across a secondary winding 71 and this positive pulse is connected to the control electrode of a pulse generator electron tube 72. The positive pulse tends to render the pulse generator electron tube 72 conducting, which causes the potential at the anode to drop, which in turn causes the control electrode to go positively. This action is cumulative and increases until full conduction is achieved in the electron tube 72, at which time the field in the transformer 70 collapses and the potential at the control electrode drops to the value of the voltage applied to a biasing terminal 73. Thus, a pulse of current flows through the pulse generator electron tube 72 and the primary winding 69 of the transformer 70.

By means of another secondary winding 74, a negative pulse is derived which may be applied to terminal 26 of the counting interconnection circuit of FIG. 2. In addition, the negative going pulse appearing across the secondary winding 74 may be coupled to the "0" side of the count control circuit 15 via a coupling capacitor 75 and a diode 76.

The threshold potential on the diode 76 is derived from a voltage divider including a resistor 77 and a resistor 78. The voltage across the voltage divider of the resistors 77 and 78 is determined by the voltage which appears across the cathode resistor 79 associated with the cathode follower electron tube 80, the condition of conduction of which may be determined by the output from the sensing circuit including the diodes 51 and 52 of FIG. 2. The cathode follower electron tube 80 is included to reduce interaction between the count control circuit 15 and the sensing circuit.

When the voltage across the cathode resistor 79 is relatively high, a threshold potential is placed on the diode 76 to inhibit the passage of the count pulses.

As was previously noted with respect to FIG. 2, the voltage appearing across the resistor 53 of the sensing circuit is relatively high when the number nine is registered in the counting decade. Therefore, the count control circuit 15 will remain in its "1" condition when the number nine is registered in the counting decade prior to the counting operation. This means that the count control circuit 15 will cause the count pulse gate 17 to pass a pulse to the pulse generator 13 when the next count pulse appears, since the next count pulse is provided after the next significant digit is shifted into the counting decade.

The apparatus of FIG. 3 provides one suitable means for passing a carry count to the counting interconnection circuit when the preceding registration is the number nine. On the other hand, when the sensing circuit of FIG. 2 provides a relatively low voltage across the resistor 53, the voltage across the cathode resistor 79 of FIG. 3 will be relatively low and a suitable threshold potential will be established on the diode 76 to allow the count pulse passed by the capacitor 75 to be applied to the "0" side of the count control circuit 15. This causes the count control circuit 15 to assume its "0" condition where the voltage derived from the "1" side is relatively low. This in turn causes the voltage across the resistor 63 to assume a relatively low potential, in response to which, a threshold potential appears across the diode 64 such that any count pulses applied to the terminal 66 are inhibited from passing to the buffer amplifier electron tube 67 of the pulse generator 13.

The apparatus shown in the schematic circuit diagram of FIG. 4 is an example of one type of circuitry which may be employed as a bi-stable circuit in the register 10 of FIGS. 1 and 2, and the count control circuit 15 of FIGS. 1 and 3. The circuit includes two electron tubes 81 and 82 which are cross-coupled in a manner similar to an Eccles-Jordan multivibrator. The circuit is bi-stable so that one of the electron tubes 81 and 82 is maintained conducting, while the other of the electron tubes is non-conducting.

Assuming that the electron tube 81 is conducting, and the electron tube 82 is cut off, a negative pulse applied to the terminal 83 via a diode of the circuitry of FIG. 2 or 3 is coupled to the control electrode of the electron tube 81 via the diode 84. This decreases the conduction in the electron tube 81, thereby causing the potential at the anode to go positively. The positive excursion is coupled to the control electrode of the other electron tube 82 which tends to render that electron tube conducting, thereby causing the potential at the anode of the electron tube 82 to decrease. This decrease in potential is in turn coupled to the control electrode of the electron tube 81, thereby causing a cumulative action which ultimately results in the electron tube 82 being rendered conducting, and the electron tube 81 being rendered non-conducting. In like manner, when a negative pulse is applied to the terminal 86 via a diode of the circuitry of FIG. 2 or 3, it is coupled to the control electrode of the electron tube 82 via the diode 87, thereby tending to render the electron tube 82 non-conducting, which ultimately results in the electron tube 81 being rendered conducting and the electron tube 82 being rendered cut off.

Output voltages may be derived from the cross-coupled electron tubes 81 and 82 by means of conventional cathode follower electron tubes 89 and 90. The inclusion of cathode followers in the output of the bi-stable circuit minimizes the effect which the output circuits may have upon the bi-stable circuit. As shown, an output voltage may be derived from the cathode of the electron tube 90 at a terminal 91. The voltage appearing at the terminal 91 represents the condition of conduction in the electron tube 82. That is, when the electron tube 82 is conducting, the terminal 91 is at a relatively low potential, and when the electron tube 82 is cut off, the voltage appearing at the terminal 91 is relatively high. In like manner, the voltage appearing at a terminal 92 connected to the cathode of the electron tube 89 represents the condition of conduction of the electron tube 81.

By means of the terminals 93 and 94, which are connected to intermediate points on the cathode resistors of the cathode follower electron tubes 89 and 90, voltages may be derived which are of less magnitude than those appearing at the terminals 91 and 92.

To form a binary conuter for use in the first decade of the register 10 of FIGS. 1 and 2, four of the bi-stable circuits of FIG. 4 may be used. The corresponding terminal designations 83, 86, 91, and 92, used in interconnecting the bi-stable circuits as a counter, are shown in the counter of FIG. 2. Thus it will be apparent from the description of FIG. 2 the manner in which the circuit of FIG. 4 is incorporated as a bi-stable circuit to form a binary counter. Where the decades are employed to form a register in which it is possible to shift the registration in one decade to an adjacent decade, the voltages appearing at the terminals 93 and 94 of each bi-stable circuit are connected directly to the terminals 95 and 96 respectively of a bi-stable circuit of an adjacent decade. The bi-stable circuit of FIG. 4 is adapted to receive the voltages from a bi-stable circuit of an adjacent decade at the terminals 95 and 96.

When a negative going shift pulse is applied to the terminal 97 and the voltage appearing at the terminal 95 is relatively low, the shift pulse is applied to the control electrode of the electron tube 81 via a capacitor 98, a diode 99 and the diode 84. This causes the bi-stable circuit to assume that condition where the electron tube 81 is cut off and the electron tube 82 is conducting. In like manner, when the voltage applied to the terminal 96 is relatively low, and a negative going shift pulse is applied to the terminal 97, the shift pulse is passed to the control electrode of the electron tube 82 via a capacitor 100, a diode 101 and the diode 87. This causes the bi-stable circuits to assume that condition where the electron tube 81 is conducting and the electron tube 82 is cut off.

Figure 5:
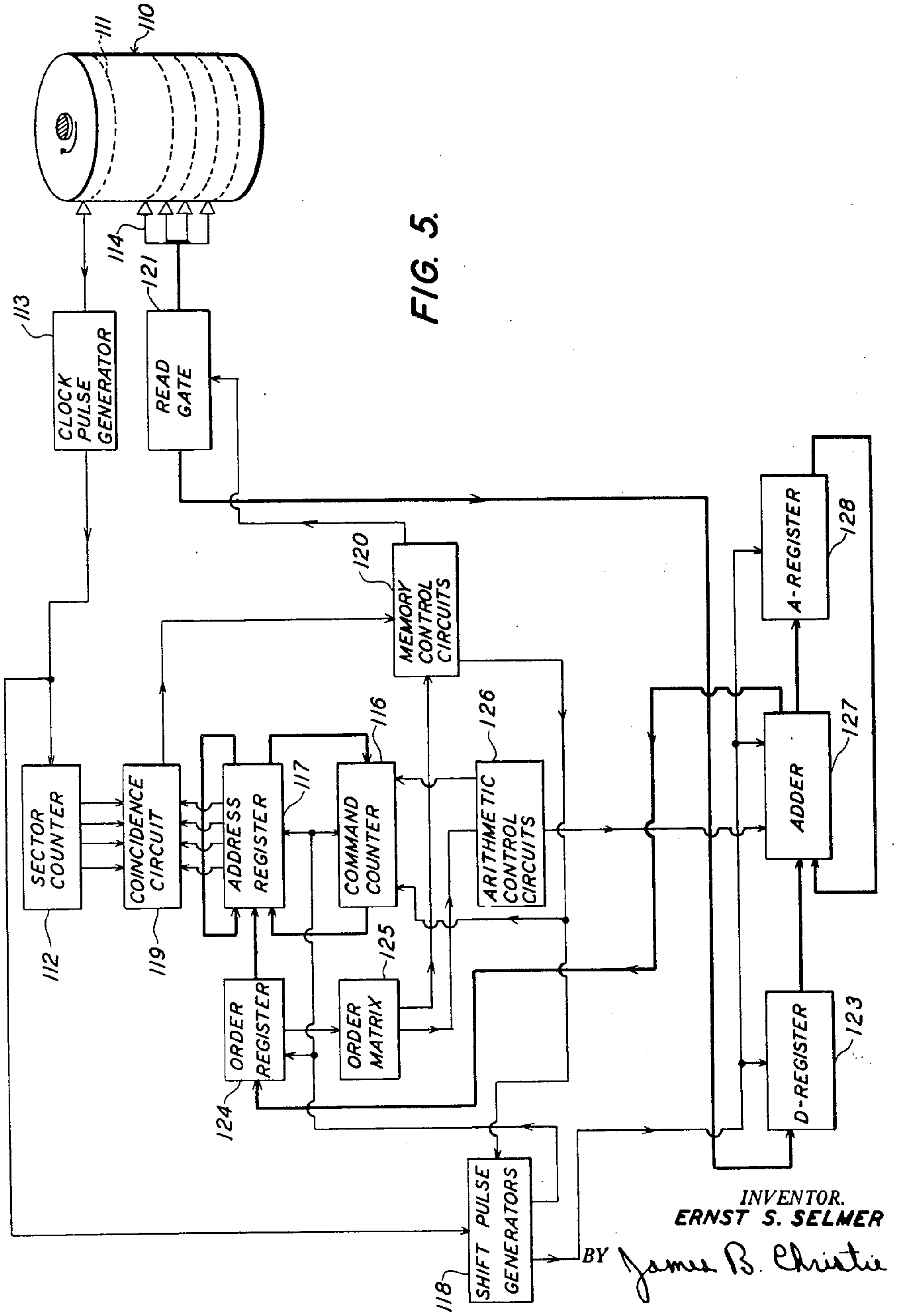
FIG. 5 is a block diagram of a digital computer illustrating one way in which the combined register and counter of the invention may be used.

FIG. 5 shows one way in which the combined register and counter of my invention may be used to advantage in a digital computer. In FIG. 5 the heavy lines indicate signal transfer links capable of passing four binary digits simultaneously in time parallel. An internal memory is provided by a conventional rotating magnetic drum 110 which will be assumed to have been recorded previously with commands and operands in separate sectors having distinct addresses around its periphery, the position of each of which is identified by a pulse on a clock track 111.

Individual addresses of the magnetic drum 110 may be identified by a sector counter 112 which, in response to pulses derived from the clock track 111 via the clock pulse generator 113, keeps step with the instantaneous position of the magnetic drum 110, thereby indicating the particular address lying under the magnetic pickup heads 114.

To initiate the operation of the computer, the address of a particular command may be registered in a command counter 116. The command counter 116 may comprise the combined register and counter of my invention as shown in FIGS. 1–4. The address registered in the command counter 116 may be shifted into an address register 117 under the influence of shift pulses derived from the shift pulse generators 118. When the address registered in the address register 117 is identical to the address registered in the sector counter 112, a coincidence circuit 119 emits a signal indicating that the address of the magnetic drum 110 corresponding to that registered in the address register 117 is under the magnetic pickup heads 114. This coincidence signal is passed to the memory control circuits 120, which in turn enable a read gate 121 to pass the word recorded in the selected address of the magnetic drum 110 to the D-register 123. As the binary coded decimal digits are presented to the D-register decade to the extreme left, they are shifted into the D-register under the influence of pulses from the shift pulse generators 118.

In one type of digital computer, each word includes ten binary coded decimal digits plus an indication of the sign of the number. This means that the D-register would comprise eleven separate decades, ten for indicating binary coded decimal digits, and one for indicating the sign of the number. Under the influence of pulses from the shift pulse generators 118, the command registered in the D-register is shifted into the order register 124 and the address register 117 via the added 127. In this particular type of computer, a portion of the derived command representing an order is registered in the order register 124, while another portion of the command representing an operand address is registered in the address register 117.

As the derived command is being shifted through the adder 127 into the order register 124 and the address register 117, the address of the derived command is being shifted out of the address register 117 into the command counter 116.

The function of the command counter is to keep track of the command which is being executed and to indicate the next succeeding command to be derived from the memory. Therefore, the combined register and counter of my invention may be employed as a command counter to increase the address of the derived command by one count. When the memory control circuits 120 have passed a command to the D-register 123, a signal is applied to the shift pulse generators 118 to initiate the transfer of the command to the order register 124 and the address register 117 via the adder 127, and, in addition, the signal from the memory control circuits 120 is applied to the count control circuit described in connection with FIGS. 1 and 2 and included in the command counter 116, to initiate a counting operation.

When the count control circuit is in the condition where a count pulse may be passed to the counting interconnection circuit, a counting pulse is provided by the arithmetic control circuits 126, which actuates the counting interconnection circuit so that the registration in the end decade of the command counter 116 is increased by a count of one. As previously noted, if a carry operation is to be performed, the count control circuit is automatically maintained in counting position by a sensing circuit and the next succeeding counting pulse in the arithmetic control circuits 126 is passed to the end decade of the command counter after the next succeeding digit has been shifted into that decade.

In the normal computation cycle of the computer of FIG. 5, the next operation is to derive the operand residing in the address of the magnetic drum 110 corresponding to the address registered in the address register 117. When the registration in the sector counter 112 corresponds to the address in the address register 117, the coincidence circuit 119 applies a coincidence signal to the memory control circuits 120 which in turn establish a threshold on the read gate 121. The threshold on the read gate enables the gate to pass the word residing under the magnetic pickup heads 114 to the D-register 123. The individual digits of the word are shifted into the D-register by means of shift pulses from the shift pulse generators 118 in the same manner as previously described. An order matrix 125, which is connected to the order register 124, distinguishes between the various computations and manipulations of which the computer is capable, and applies a signal to the arithmetic control circuits 126 when an arithmetic operation is to be performed. The arithmetic control circuits 126 in turn control the operation of the adder 127. In accordance with a particular order, the arithmetic computation then is performed in the adder 127, within which a registration appearing in the A-register 128 may be added or subtracted, digit after digit, from the registration in the D-register 123.

A detailed explanation of the operation of the adder, along with the D-register, the A-register and the arithmetic control circuits may be found in my co-pending United States Patent Application, filed on September 25, 1953, Serial No. 382,401, now Patent No. 2,947,479, entitled "Electronic Adder," and my co-pending United States Patent Application, filed on December 17, 1953, Serial No. 398,834, now Patent No. 2,798,156, entitled "Digit Pulse Counter,"

At the completion of the arithmetic computation, the address registered in the command counter 116 is shifted into the address register 117 and the cycle of operations repeats itself with the deriving of the next command and the execution of the derived command. Since the registration in the command counter is increased by a count of one, the next command to be derived from the magnetic drum 110 resides in the address immediately succeeding the address of the previously derived command.

Although the combined register and counter of my invention has been employed to advantage in a digital computer similar to that shown in FIG. 5, it will be appreciated that the invention may be used in any application where digital information is shifted, digit after digit, through a shifting register, and the registration is to be increased by a predetermined number of counts as the information is being shifted into the register.

In addition, I believe that the combined register and counter may be used separately to advantage as a counter alone. By re-circulating the registeration through the combined register and counter, a counting operation may be performed up to a number of digits equal to the number of decades in the register, each digit of which has a maximum count equal to the number of allowable permutations in the decade. Where my invention is used as a counter, a single counting interconnection circuit associated with a single decade may be employed, along with a plurality of associated digit registering decades, to form a counter having a counting capability greatly in excess of the counting capability of the single decade itself.

I claim:

1. A combined register and counter, including in combination a plurality of sets of bi-stable circuits each of which is adapted to register a binary coded digit, means interconnecting the plurality of sets whereby the digits of a multiple digit number may be shifted into and registered in the plurality of sets, means interconnecting the bi-stable circuits of a selected one of the plurality of sets to form a counter, a source of count pulses, means coupled between the source of count pulses and the counting interconnecting means for normally advancing the counter by a single count, whereby the registration in the selected set is increased by one count, a sensing circuit coupled to the selected set for sensing when the counter is equal to a predetermined number, means shifting the registration out of the selected set and shifting the next registration into the selected set, and means responsive to the sensing circuit for automatically actuating said means for advancing the counter after said next registration is shifted to the counter, whereby the registration in the selected set is increased by one count when the sensing circuit indicates that the preceding registration in the selected set was equal to said predetermined number.

2. A combined register and counter, including in combination a plurality of sets of bi-stable circuits each of which is adapted to register a binary coded digit; a plurality of shifting circuits each of which is connected between two of the plurality of sets; means applying signals representing binary coded digits to a selected one of the plurality of sets; a counting circuit interconnecting the bi-stable circuits of the seletced set; a source of count pulses; a count pulse gate coupled between the source of count pulses and the counting circuit; a count control circuit coupled to the count pulse gate; means energizing the count control circuit, whereby at least one count pulse is passed from the source of count pulses to the counting circuit when the first digit from the source of binary coded digits is applied to the selected set; a sensing circuit coupled to the selected set for providing a signal when the registration therein exceeds a predetermined number; and means coupled between the sensing circuit and the counter control circuit for maintaining the count control circuit in energized position when the signal from the sensing circuit indicates that the registration in the selected set is equal to a predetermined number, whereby at least one count pulse is applied to the counting circuit to provide a carry when each succeeding digit from the source of binary coded digits is registered therein and the preceding registration in the selected set was equal to the predetermined number.

References Cited in the file of this patent

UNITED STATES PATENTS

| | | |
|---|---|---|
| 2,591,931 | Grosdoff | Apr. 8, 1952 |
| 2,634,052 | Bloch | Apr. 7, 1953 |
| 2,672,283 | Havens | Mar. 16, 1954 |
| 2,700,502 | Hamilton et al. | Jan. 25, 1955 |
| 2,700,504 | Thomas | Jan. 25, 1955 |
| 2,703,202 | Cartwright | Mar. 1, 1955 |
| 2,767,908 | Thomas | Oct. 23, 1956 |
| 2,819,840 | Huntley et al. | Jan. 14, 1958 |
| 2,844,310 | Cartwright | July 22, 1958 |

OTHER REFERENCES 24-digit Parallel Computer with Magnetic Drum Memory, published by ERA, 1949, p. 9, 31–33 and 3.4–2, 3.4–4, and 3.4–5 relevant.